United States Patent
Sasaki et al.

(10) Patent No.: US 7,390,348 B2
(45) Date of Patent: Jun. 24, 2008

(54) HYDROGEN PERMEATION ALLOY AND A METHOD OF MANUFACTURING THE SAME

(75) Inventors: Tsuyoshi Sasaki, Muroran (JP); Toshiki Kabutomori, Muroran (JP); Kiyoshi Aoki, Kitami (JP); Kazuhiro Ishikawa, Kitami (JP)

(73) Assignees: The Japan Steel Works, Ltd., Tokyo (JP); National University Corporation Kitami Institute of Technology, Hokkaido (JP)

( * ) Notice: Subject to any disclaimer, the term of this patent is extended or adjusted under 35 U.S.C. 154(b) by 0 days.

(21) Appl. No.: 11/526,829

(22) Filed: Sep. 26, 2006

(65) Prior Publication Data

US 2007/0068383 A1   Mar. 29, 2007

(30) Foreign Application Priority Data

Sep. 26, 2005 (JP) .......................... P2005-277343

(51) Int. Cl.
*B01D 53/22* (2006.01)
*B01D 71/02* (2006.01)

(52) U.S. Cl. .................. 95/56; 96/4; 55/523; 55/DIG. 5

(58) Field of Classification Search ........................ 96/4, 96/7, 8, 10, 11; 95/55, 56; 55/523, 524, 55/DIG. 5
See application file for complete search history.

(56) References Cited

U.S. PATENT DOCUMENTS 6,649,559 B2 * 11/2003 Drost et al. ..................... 95/56
7,001,446 B2 *  2/2006 Roark et al. ................... 95/56

FOREIGN PATENT DOCUMENTS

| EP | 1 566 457 | * | 8/2005 |
|---|---|---|---|
| EP | 1 566 457 A1 | | 8/2005 |
| JP | 11-276866 A | | 10/1999 |
| JP | 2000-159503 A | | 6/2000 |
| JP | 2004-42017 | * | 2/2004 |
| JP | 2004-042017 A | | 2/2004 |

* cited by examiner

*Primary Examiner*—Jason M. Greene
(74) *Attorney, Agent, or Firm*—Sughrue Mion, PLLC

(57) ABSTRACT

In a multiphase hydrogen permeation alloy comprising a phase in charge of hydrogen permeation and a phase in charge of hydrogen embrittlement resistance, a structure in which the phase in charge of hydrogen permeability is continuously interconnected and in which more preferably the growth direction of the aforementioned phase in charge of hydrogen permeation lies aligned in the thickness direction of the permeation membrane. As the hydrogen permeation alloy, an Nb—Ti—Co alloy is exemplified, wherein the phase in charge of hydrogen permeability is made of an (Nb, Ti) phase and the aforementioned phase in charge of hydrogen embrittlement resistance is made of a CoTi phase. By virtue of the fact that the growth direction of the phase in charge of hydrogen permeation lies aligned in the thickness direction of the permeation membrane, the hydrogen permeation pass length becomes short to give further improved hydrogen permeation property.

4 Claims, 2 Drawing Sheets

FIG. 1A
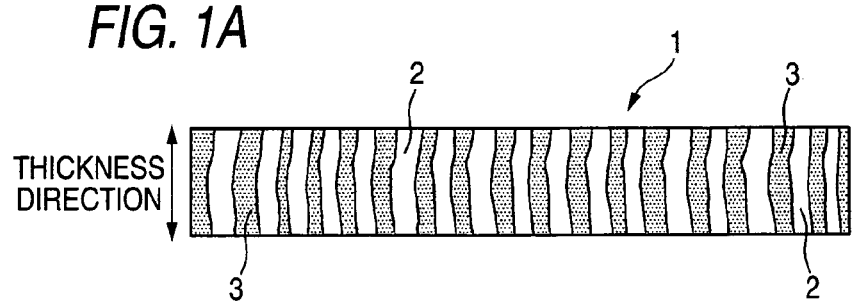
FIG. 1B
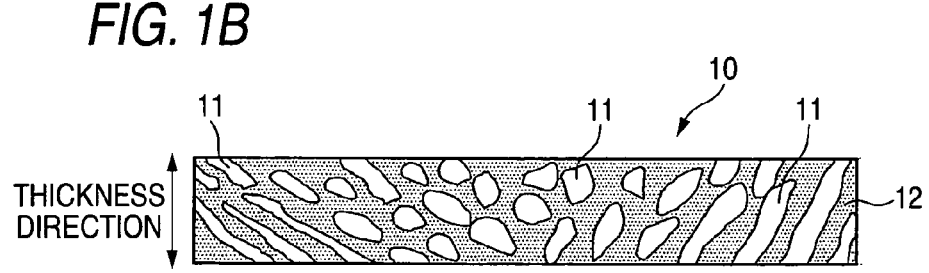
FIG. 2A
FIG. 2B
STRUCTURAL MICROGRAPHS OF Nb30Ti35Co35
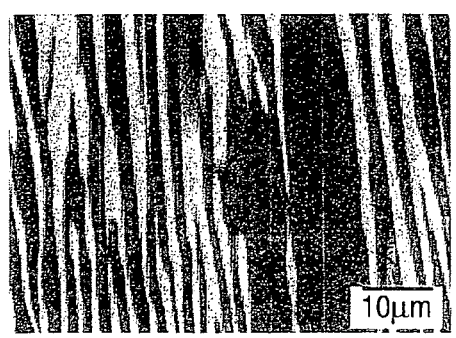
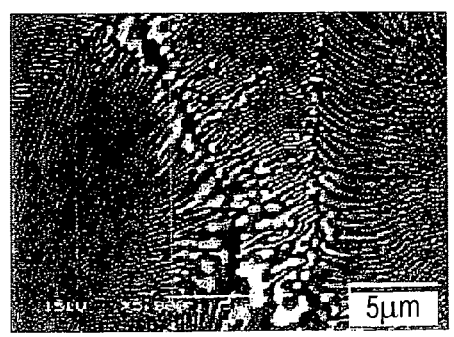

HYDROGEN PERMEATION ALLOY AND A METHOD OF MANUFACTURING THE SAME

This application is based on Japanese Patent Application No. 2005-277343, which is incorporated herein by reference.

BACKGROUND OF THE INVENTION

1. Field of the Invention

The present invention relates to a hydrogen permeation alloy used for hydrogen permeation membranes adopted for hydrogen separation and purification, and a method of manufacturing the same.

2. Description of the Related Art

High-purity hydrogen is in use for the production of semiconductors, optical fibers and pharmaceuticals, and the use amount thereof is increasing annually. Further, hydrogen is attracting social attention as the fuel for fuel cells recently. If fuel cells are to be used in a large scale towards the future, a huge amount of high-purity hydrogen is required. Accordingly, development of the manufacturing method capable of producing a large amount of high-purity hydrogen at a low cost is desired.

The method for mass production of hydrogen includes (1) first method based on electrolysis of water using non-fossil resources and (2) second method based on stream reforming using fossil resources. In the first method (1) based on electrolysis, electrolysis of water conducted by the electricity obtained by solar power generation as the electric power source is under study, but this process is difficult to put into practice with the current technical level. Accordingly, for the time being, production of hydrogen via the second method (2), i.e., steam reforming of hydrocarbon is more realistic.

In the case of producing hydrogen by steam reforming of hydrocarbon, the reaction system contains, in addition to a huge amount of hydrogen, impurities such as $CO$, $CO_2$, $H_2O$ and $CH_4$. For the utilization of hydrogen as the supply source for fuel cells, hydrogen must be separated and purified from these impurities. Further, if the CO content in purified hydrogen is not lower than 10 ppm, damaging of the Pt electrode of the fuel cell occurs. In other words, for the utilization of hydrogen for fuel cells, purification to an extremely high purity is an essential condition.

The purification method for hydrogen includes, an absorption method, a cryogenic distillation method, an adsorption method and a membrane separation method. From the viewpoint of efficient production of high-purity hydrogen, the membrane separation method using a metal membrane is attracting attention.

The permeation mechanism in a metal membrane is as follows. When a hydrogen pressure difference exists via a metal membrane, hydrogen molecules ($H_2$) are dissociated at the metal surface to atoms (H) in the high-pressure side whereby the atoms dissolve, diffuse in the metal. These hydrogen atoms permeate the metal membrane to the low-pressure side. At the surface of the low-pressure side, the atoms recombine to $H_2$. As a result, the hydrogen is purified. Purification of hydrogen using a metal membrane is characterized by quite large selectivity and permiability. It is possible, for example, to purify hydrogen with roughly 99% purity to an order of 99.99999%. Accordingly, for purification of high-purity hydrogen for fuel cells, the membrane separation using a metal membrane is regarded as well suited.

As the current hydrogen permeation membrane, those made of Pd alloys are mainly in practical use. However, in the case where fuel cells are used widely as a mainstream requiring a huge amount of hydrogen, the demand for Pd—Ag alloys as the hydrogen permeation metal membrane will increase correspondingly. Then, Pd, which is expensive and scarce as resources, will become a bottleneck whereby it is assumed that Pd alloys cannot then meet such demand. Hence, development of materials for the metal membrane replacing Pd alloys is an urgent need.

For example, in JP-A-11-276866, alloys using V, Nb or Ta as a base are disclosed. V, Nb and Ta are known to have hydrogen permeation property superior to that of Pd alloys. However, hydrogen dissolves in these elements in high concentration, and thus cracking accompanied by hydrogen embrittlement readily proceeds when these elements are used in single-metal. Accordingly, it is necessary to decrease the hydrogen dissolution amount by alloying. Generally speaking, however, incorporation of an element that enhances crack resistance causes hydrogen permeation property to deteriorate. Since no definite description is given on the kind as well as the amount of the element to be added in the JP-A-11-276866, it is impossible to attain a practical hydrogen permeation alloy provided with excellent hydrogen permeability and crack resistance.

Also in JP-A-2000-159503, Nb-based hydrogen permeation alloys are described. Though these alloys assume to be composed of a single phase, it is difficult to thrust two properties of hydrogen permeation and hydrogen embrittlement resistance, which conflict with each other, on a single phase. When one tries to suppress hydrogen embrittlement with these alloys, the hydrogen dissolution amount inevitably reduces, causing hydrogen permeability to deteriorate.

In addition, for the suppression of hydrogen embrittlement, JP-A-2004-42017 discloses a hydrogen permeation membrane in which an alloy structure is made amorphous. However, since the diffusion coefficient of hydrogen in an amorphous material is generally lower than that in crystalline materials, high hydrogen permeability cannot be attained. Moreover, an amorphous material tends to crystallize with the elevation of temperature, limitation on the use temperature generates. Particularly, in an amorphous alloy fabricated for hydrogen permeation, crystallization proceeds at lower temperatures in hydrogen than in other atmospheres since it contains an element having a strong bonding force to hydrogen.

In order to make a hydrogen permeation alloy provided with hydrogen permeability and hydrogen embrittlement resistance, there is an idea of using a multiphase alloy in which each of hydrogen permeability and hydrogen embrittlement resistance is charged to a different phase, respectively. Some of the inventors for the present application have proposed Nb—Ti—Co-based alloys from such a viewpoint. In this type of alloy, it is alleged that hydrogen permeation property and hydrogen embrittlement resistance equivalent to or better than those of Pd alloys are exhibited by virtue of allotting hydrogen permeability to the (Nb, Ti) phase and hydrogen embrittlement resistance to the CoTi phase.

However, the Nb—Ti—Co alloy mentioned above is not provided with sufficient hydrogen permeation property, which thus must be improved. In this type of Nb—Ti—Co alloy, the (Nb, Ti) phase, which forms the hydrogen permeation pass, constitutes a granular and lamellar structure. In a granular structure, the portions where the (Nb, Ti) phase is disconnected acts as barriers for hydrogen permeation to lower the hydrogen permeation rate. In a lamellar structure, in which the growing direction of each (Nb, Ti) phase is not consistent, the hydrogen permeation pass connecting these (Nb, Ti) phase becomes extremely long, which fact acts as a cause to lower hydrogen permeability.

SUMMARY OF THE INVENTION

The invention, which has been devised under the situations described heretofore, has objects to provide a hydrogen permeation alloy having enhanced hydrogen permeation capability by virtue of structure control and a method of manufacturing the same.

Namely, according to a first aspect of the invention, a hydrogen permeation alloy comprises a phase in charge of hydrogen permeability, and a phase in charge of hydrogen embrittlement resistance, wherein the phase in charge of hydrogen permeability has a continuously interconnected structure.

According to a second aspect of the invention, a growth direction of the phase in charge of hydrogen permeability lies aligned in the thickness direction of the permeation membrane.

According to a third aspect of the invention, the hydrogen permeation alloy comprises an Nb—Ti—Co alloy, the phase in charge of hydrogen permeability comprises an (Nb, Ti) phase, and the phase in charge of hydrogen embrittlement resistance comprises a CoTi phase.

According to a fourth aspect of the invention, a method of manufacturing a hydrogen permeation alloy, the hydrogen permeation alloy comprising a phase in charge of hydrogen permeability and a phase in charge of hydrogen embrittlement resistance, the method comprises growing the phase in charge of hydrogen permeation at a growth rate of 50 mm/h or less to make the phase in charge of hydrogen permeation assume a continuously interconnected structure.

According to the hydrogen permeation alloy of the invention, excellent hydrogen permeation properties and excellent hydrogen embrittlement resistance are demonstrated in a multiphase hydrogen permeation alloy by virtue of allotting hydrogen permeability and hydrogen embrittlement resistance to different phases. By growing the phase in charge of hydrogen permeation in these two phases so as to be continuously interconnected without forming a granular structure, the hydrogen permeation pass has no disconnection. Accordingly, good hydrogen permeation property can be obtained. The direction of such interconnection is preferably that of hydrogen permeation, in particular. Further, by aligning the growth direction of the phase in charge of hydrogen permeability in the thickness direction (which is usually the direction of hydrogen permeation) of the permeation membrane, the hydrogen permeation pass becomes short. Accordingly, good hydrogen permeation property can be obtained.

As has been explained heretofore, according to the hydrogen permeation alloy of the present invention, which is of multiphase provided with both of hydrogen permeability and hydrogen embrittlement resistance, excellent hydrogen permeability is achieved since the phase in charge of hydrogen permeation is configured in a continuously interconnected structure free of any disconnection in the hydrogen permeation pass.

A structure in which the phase in charge of hydrogen permeation is in a continuously interconnected structure means that each phase does not exist in a granular form or in segments, whereby preferably each phase is substantially interconnected in a specified direction.

In addition, still more excellent hydrogen permeation property can be achieved by aligning the growth direction of the phase in charge of hydrogen permeation in the thickness direction in the hydrogen permeation membrane whereby the hydrogen permeation pass length is curtailed.

According to the method of manufacturing the hydrogen permeation alloy of the invention, the alloy being a multiphase hydrogen permeation alloy comprising a phase in charge of hydrogen permeability and a phase in charge of hydrogen embrittlement resistance, the phase in charge of hydrogen permeability is grown at a growth rate of 50 mm/hr or less to form a continuously interconnected structure, thereby enabling the above-mentioned hydrogen permeation alloy to be obtained with certainty and achieving the aforementioned various advantages.

BRIEF DESCRIPTION OF THE DRAWINGS

FIGS. 1A and 1B show schematic drawings illustrating the structures of hydrogen permeation alloys according to the invention and related art;

FIGS. 2A and 2B show photographs, as substitutes for drawing, each showing the structure of the sampled material in Example or in Comparative Example.

DETAILED DESCRIPTION OF THE PREFERRED EMBODIMENTS

Figure 3:
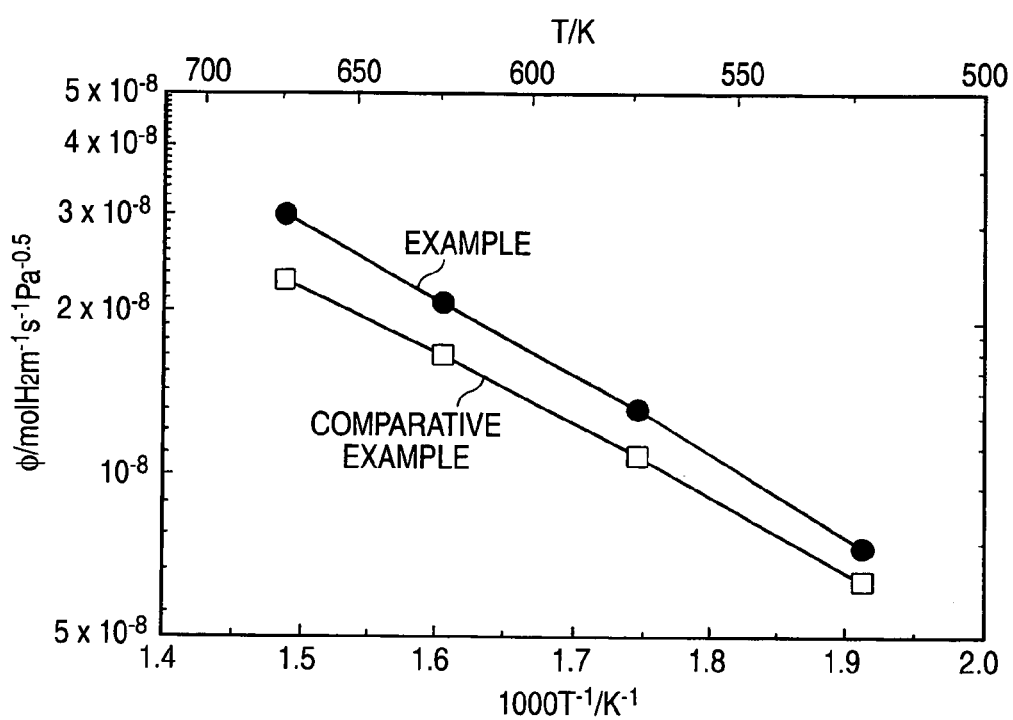
FIG. 3 shows the hydrogen permeability of the sampled material in Example and in Comparative Example at various temperatures.

The hydrogen permeation alloy of the invention is a multiphase hydrogen permeation alloy comprising a phase in charge of hydrogen permeability and a phase in charge of hydrogen embrittlement resistance. The types of these phases are not particularly restricted, but typically, in Nb—Ti—Co-based alloys, those in which the phase in charge of hydrogen permeability is an (Nb, Ti) phase and the phase in charge of hydrogen embrittlement resistance is a CoTi phase. With respect to the quantitative ratios of the Nb—Ti—Co alloy, which is not specifically restricted for the invention, alloys represented by the general formula, $Nb_xTi_{(100-x-y)}Co_y$, (where $x \leq 70$, $20 \leq y \leq 50$, $x+y<100$ (mol %)) can be mentioned as representative examples.

Relations between the above-mentioned quantitative ratios and the physical properties are described briefly. First of all, when the Nb content exceeds the range defined above, hydrogen embrittlement is liable to occur. Thus, the Nb content preferably needs to fall under the above-mentioned range. Moreover, for the same reason, the upper limit is preferably set at 60 mol %. On the other hand, since low Nb contents fail in exhibiting sufficient hydrogen permeation property, the lower limit is preferably set at 10 mol %, and more preferably set at 21 mol %.

Further, low Co contents cause the CoTi phase, which contributes to hydrogen embrittlement resistance, to be deficient whereby sufficient hydrogen embrittlement resistance cannot be demonstrated. Thus, Co contents not less than 20 mol % are preferred. In addition, since contents exceeding 50 mol % increase the Co-containing phases such as CoTi, which does not contribute to hydrogen permeation, to an undesirably high degree to deteriorate hydrogen permeation properties, the Co content preferably needs to fall under the above-mentioned range. For the same reason, the lower limit for the Co content is preferably set at 25 mol % and the higher limit at 45 mol %.

The hydrogen permeation alloy of the invention can make the phase in charge of hydrogen permeability in a continuously interconnected structure by growing the aforementioned phase in charge of hydrogen permeability (for example, an (Nb, Ti) phase) at a growth rate of 50 mm/hr or less. When the phase in charge of hydrogen permeation is grown at a growth rate exceeding 50 mm/hr, the phase grows not continuously but segmentally. Thus, the growth rate is preferably 50 mm/hr or less. For the same reason, a growth rate of 30 mm/hr or less is more preferable.

The hydrogen permeation alloy of the invention can be manufactured according to ordinary processes; for example, such an alloy is manufactured by controlling elements such as Nb, Ti and Co to appropriate quantitative ratios. Preferably, the quantitative ratios are set so as to be represented by general formula $Nb_xTi_{(100-x-y)}Co_y$ ($x \leq 70$, $20 \leq y \leq 50$).

And, for such an alloy, as the method of growing the phase in charge of hydrogen permeation continuously and in the direction parallel to the thickness direction of the permeation membrane, the uni-directional solidification process such as the floating zone method and the Bridgeman method can be readily applied. In addition, membrane-forming methods such as sputtering, CVD or plating, or powder sintering methods can be applied.

So long as the condition that the growth rate of the (Nb, Ti) phase does not exceed 50 mm/hr is satisfied, membrane formation is not limited to those by uni-directional solidification method, but methods such as sputtering, CVD or plating can also be applied. Furthermore, the powder sintering method can be applied by adopting such a production method that enables the (Nb, Ti) phase to be continuously interconnected in the thickness direction.

The hydrogen permeation alloy obtained by any of the aforementioned methods is fabricated into the state of a permeation membrane 1 as shown in FIG. 1A, wherein the membrane comprises a phase 2 in charge of hydrogen permeation and a phase 3 in charge of hydrogen embrittlement resistance, and the phase 2 in charge of hydrogen permeation is substantially continuously interconnected, and, at the same time, the growth direction thereof lies aligned in the thickness direction of the permeation membrane 1. With such a structure, good hydrogen permeation performance can be demonstrated in the thickness direction of the permeation membrane 1.

On the other hand, a related permeation membrane 10, which falls outside the scope of the invention and has a structure like one resulting from cutting out a piece of a hydrogen permeation alloy in the form of ingot produced by an ordinary melting process, certainly comprises a phase in charge of hydrogen permeation 11 and a phase in charge of hydrogen embrittlement resistance 12 as shown in FIG. 1B. But, in the phase 11 in charge of hydrogen permeation, not only the (Nb, Ti) phase is not grown in parallel to the thickness direction, but also the (Nb, Ti) phase has partly a granular structure. Thus, the hydrogen permeation efficiency in the thickness direction is deteriorated.

Namely, the hydrogen permeation alloy of the invention can be used as one that exhibits desirable hydrogen permeation property in a number of applications. This type of hydrogen permeation material not only exhibits excellent hydrogen permeability but also is provided with excellent resistance against the embrittlement due to hydrogen permeation.

EXAMPLE

As an Nb—Ti—Co alloy, an alloy ingot having a composition of $Nb_{30}Ti_{35}Co_{35}$ was produced by arc melting. The alloy ingot thus produced was processed to a cylindrical form with a diameter of about 12 mm and a length of 100 mm by means of a wire discharge machine. This piece was then subjected to unidirectional solidification under an Ar atmosphere by the floating zone method. The solidification rate for this operation was 20 mm/hr.

From the cylinder subjected to unidirectional solidification, a circular plate with a thickness of 1 mm was sampled. A test piece was obtained by polishing both of the circular plate to mirror surfaces, and then forming, on both surfaces, a Pd film with about 100 nm thickness by sputtering for the purposes of oxidation prevention and provision of a catalytic activity for hydrogen absorption as well as dissociation. The test piece thus prepared was mounted in a hydrogen permeation testing apparatus, and was heated to 400° C. under vacuum evacuation of the surface of the test piece on which the Pd film was formed. After the temperature reached 400° C., hydrogen was fed to the surface of the test piece on which the Pd film was formed to measure the hydrogen flux under the condition of a secondary side pressure of 0.1 MPa and a primary side pressure of 0.2 MPa. By raising the primary side pressure stepwise to 0.6 MPa, the hydrogen flux was measured for each step of pressure changing. After the measurement at 400° C., the hydrogen flux was also measured in the same manner at 350° C., 300° C. and 250° C., respectively.

The hydrogen permeability ($\phi$) and the hydrogen flux (J) have the relationship expressed by the following equation (1).

$$\phi = J \times L/A/(P_1^{0.5} - P_2^{0.5}) \tag{1}$$

wherein L represents sample thickness, A represents permeation area, $P_1$ represents hydrogen pressure at the primary side, and $P_2$ represents hydrogen pressure at the secondary side.

Accordingly, plotting the value of $A \times (P_1^{0.5} - P_2^{0.5})$ on the abscissa, and the value of $J \times L$ on the ordinate for the data obtained by changing the primary side pressure, a linear relation is obtained for each temperature whereby the slope of the line represents $\phi$. By making use of this relationship, the hydrogen permeability ($\phi$) is obtained at each temperature. Hydrogen permeation property was compared in terms of the hydrogen permeability. By way of precaution, in the hydrogen permeation test, tests were also conducted on test pieces sampled from arc-melted ingot of the Nb—Ti—Co alloy having the same composition as a comparative material.

Structural micrographs for Example and Comparative Example are shown in FIG. 2A and FIG. 2B, respectively. In Example, the individual (Nb, Ti) phase is grown continuously without any disconnection, and at the same time, the growth direction is in parallel to the direction of the sample thickness. In contrast thereto, in Comparative Example the (Nb, Ti) phase is not grown in parallel to the thickness direction. Moreover, in the (Nb, Ti) phase of the Comparative Example, each length is small and segmental, and further there exist portions having a granular structure whereby the individual (Nb, Ti) phase is not in contact with each other but exists independently isolated.

FIG. 3 shows the hydrogen permeation coefficient. In each sample piece, no cracking took place even when hydrogen was introduced, showing good hydrogen embrittlement resistance. It is seen that Example is superior in permeation coefficient to Comparative Example in any temperature to a large extent, indicating that the invention can provide an excellent hydrogen permeation alloy.

What is claimed is:

1. A hydrogen permeation alloy comprising:
    a phase in charge of hydrogen permeability; and
    a phase in charge of hydrogen embrittlement resistance,
    wherein the phase in charge of hydrogen permeability has a continuously connected structure; and
    a growth direction of the phase in charge of hydrogen permeability lies aligned in the thickness direction of the permeation membrane.

2. The hydrogen permeation alloy according to claim 1,
wherein the hydrogen permeation alloy comprises an Nb—Ti—Co alloy,
wherein the phase in charge of hydrogen permeability comprises an (Nb, Ti) phase, and
wherein the phase in charge of hydrogen embrittlement resistance comprises a CoTi phase.

3. A method of manufacturing a hydrogen permeation alloy, the hydrogen permeation alloy comprising a phase in charge of hydrogen permeability and a phase in charge of hydrogen embrittlement resistance, the method comprising:

growing the phase in charge of hydrogen permeability at a growth rate of 50 mm/hr or less to make the phase in charge of hydrogen permeability in a continuously interconnected structure.

4. The method according to claim 3, wherein a growth direction of the phase in charge of hydrogen permeability lies aligned in the thickness direction of the permeation membrane.

* * * * *